(12) United States Patent
Freund et al.

(10) Patent No.: US 9,276,757 B1
(45) Date of Patent: Mar. 1, 2016

(54) GENERATING VIRAL METRICS

(75) Inventors: Martin B. Freund, Mountain View, CA (US); Momchil Filev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 13/548,954

(22) Filed: Jul. 13, 2012

(51) Int. Cl.
*G06F 3/00* (2006.01)
*H04L 12/18* (2006.01)
*H04L 12/24* (2006.01)
*H04L 12/58* (2006.01)
*G06F 17/30* (2006.01)

(52) U.S. Cl.
CPC ...... *H04L 12/1813* (2013.01); *G06F 17/30873* (2013.01); *H04L 12/581* (2013.01); *H04L 41/22* (2013.01)

(58) Field of Classification Search
USPC .................. 715/753, 733, 738, 758
See application file for complete search history.

(56) References Cited

U.S. PATENT DOCUMENTS

| 7,620,902 | B2 * | 11/2009 | Manion et al. ............... 715/758 |
| 8,549,073 | B2 * | 10/2013 | Dale et al. .................... 709/204 |
| 8,626,828 | B2 * | 1/2014 | Lee et al. ...................... 709/203 |
| 2011/0138304 | A1 * | 6/2011 | Ungerman .................... 715/753 |
| 2013/0013393 | A1 * | 1/2013 | Koonce et al. ............. 705/14.42 |
| 2013/0066711 | A1 * | 3/2013 | Liyanage et al. .......... 705/14.43 |
| 2013/0340097 | A1 * | 12/2013 | Gowel ........................... 726/28 |

* cited by examiner

*Primary Examiner* — Anil N Kumar
(74) *Attorney, Agent, or Firm* — Fish & Richardson P.C.

(57) ABSTRACT

A method performed by one or more processing devices includes transmitting, to a first client device, content items, wherein one of the content items is selected by a user of the first client device; receiving, from a second client device, information indicative of a selection, by a user of the second client device, of a reference in a social networking system to a resource associated with the selected content item; wherein the user of the first client device has a social connection in the social networking system to the user of the second client device; and generating, based on the information received, one or more viral metrics for the selected content item.

18 Claims, 9 Drawing Sheets

GENERATING VIRAL METRICS

BACKGROUND

A resource may display content items. Generally, a resource includes item(s) of data that can be provided over a network. Resources include HTML pages, web pages, word processing documents, portable document format (PDF) documents, images, videos, applications, feed sources, and so forth. Generally, a content item includes content (e.g., words, images, hyperlinks, and so forth) for the promotion of products. An advertisement is an example of a content item.

In an example, content items may be displayed in resources of a social networking service. Generally, a social networking service includes a platform that promotes building of social connections, e.g., among people with shared interests and/or activities. Generally, a social connection may be represented by a relationship between nodes in a graph representing users of the social networking service.

In an example, the social networking service generates content streams for display of information posted by a user and/or related to the user. Generally, a content stream includes items of electronic (e.g., Web-based) content displayed in a portion of a graphical user interface designated for display of the items of electronic content. Types of items of electronic content include posts, links, images, and so forth, which are collectively referred to herein as content items, for purposes of convenience, and without limitation.

In this example, the social networking service is configured to populate the content stream with content items related to a user, including, e.g., content items that that have been transmitted by the user, content items that include information about the user and have been transmitted by other users, and so forth.

SUMMARY

In one aspect of the present disclosure, a method performed by one or more processing devices includes transmitting, to a first client device, content items, wherein one of the content items is selected by a user of the first client device; receiving, from a second client device, information indicative of a selection, by a user of the second client device, of a reference in a social networking system to a resource associated with the selected content item; wherein the user of the first client device has a social connection in the social networking system to the user of the second client device; and generating, based on the information received, one or more viral metrics for the selected content item.

Implementations of the disclosure can include one or more of the following features. In some implementations, the resource includes a landing page. In other implementations, at least one of the one or more viral metrics includes a viral click metric. In still other implementations, the reference is indicative of an endorsement of the resource for the selected content item.

In still other implementations, the method includes receiving information indicative of performance of an action following selection of the reference; and generating one or more viral action metrics for the selected content item based on the information indicative of performance of the action.

In some implementations, the method includes generating, from the one or more viral metrics, one or more derivative, viral metrics. In yet other implementations, the one or more derivative, viral metrics includes at least one of: a cost per viral action metric; and a cost per viral click metric.

In still another aspect of the disclosure, one or more machine-readable media are configured to store instructions that are executable by one or more processing devices to perform operations including transmitting, to a first client device, content items, wherein one of the content items is selected by a user of the first client device; receiving, from a second client device, information indicative of a selection, by a user of the second client device, of a reference in a social networking system to a resource associated with the selected content item; wherein the user of the first client device has a social connection in the social networking system to the user of the second client device; and generating, based on the information received, one or more viral metrics for the selected content item. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: transmitting, to a first client device, content items, wherein one of the content items is selected by a user of the first client device; receiving, from a second client device, information indicative of a selection, by a user of the second client device, of a reference in a social networking system to a resource associated with the selected content item; wherein the user of the first client device has a social connection in the social networking system to the user of the second client device; and generating, based on the information received, one or more viral metrics for the selected content item. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that generates viral metrics. Generally, a viral metric includes a value that is at least partly based on the viral spread of information, e.g., information propagated in a social networking service.

There are various types of viral metrics, including, e.g., viral action (VA) metrics, viral click (VC) metrics, and so forth. Generally, a VA metric is indicative of a number of pre-defined actions (e.g., conversions) that are attributable to a social networking service. Generally, a conversion includes performance of a pre-defined action, including, e.g., a purchase of a product following viewing of a content item that features the product.

For example, a VA metric may specify a number of conversions that are attributable to display, in a content stream, of an endorsement of a landing page (for a particular content item). Generally, an endorsement includes an approval and/or a recommendation of an item of data by a user of a social networking service. Generally, a landing page includes a resource that is displayed for a user, e.g., following selection of a content item. For example, selection of the content item causes a display of the landing page.

Generally, a VC metric is indicative of a number of clicks to a landing page of a content item that are attributable to a social networking service, e.g., based on display of information related to the content item in the social networking service. The information related to the content item may include the uniform resource location ("URL") of the landing page for the content item, the endorsement of the landing page for the content item, and so forth.

Figure 1:
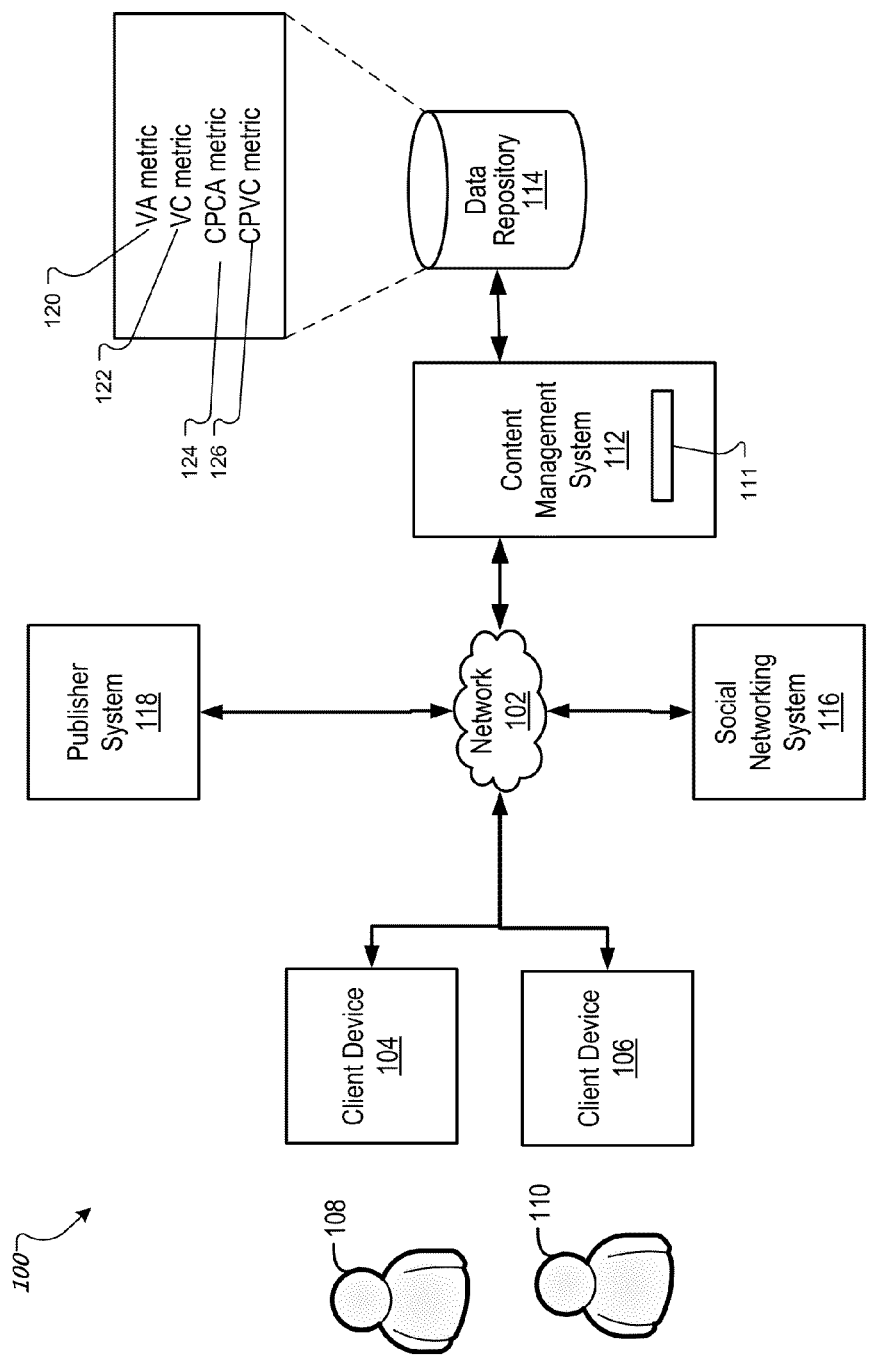
FIG. 1 is a diagram of an example of a network environment for generating viral metrics.

FIG. 1 is a diagram of an example of network environment 100 for generating viral metrics 120, 122, 124, 126. Network environment 100 includes network 102, client devices 104, 106, content management system 112, social networking system 116, publisher system 118, data repository 114, and users 108, 110. In the example of FIG. 1, user 108 may use client device 104, and user 110 may use client device 106.

Client devices 104, 106 can communicate with content management system 112 over network 102. Network environment 100 may include many thousands of data repositories, client devices, social networking systems, publisher systems, and content management systems, which are not shown. Content management system 112 may include various data engines, including, e.g., data engine 111. Although data engine 111 is shown as a single component in FIG. 1, data engine 111 can exist in one or more components, which can be distributed and coupled by network 102.

In the example of FIG. 1, social networking system 116 is configured to implement a social networking service. In this example, users 108, 110 are members of the social networking service implemented by social networking system 116. Users 108, 110 are also socially connected to each other. In this example, social networking system 116 generates a content stream for user 110. Social networking system 116 sends, to client device 106, information for a graphical user interface that displays the content stream, as described in further detail below with reference to FIG. 4.

In the example of FIG. 1, publisher system 118 is configured to host one or more resources of a publisher. Generally, a publisher includes an entity that controls, manages and/or owns a resource. In this example, client devices 104, 106 may access, from publisher system 118, one or more resources (not shown).

Content management system 112 is configured to select and to provide one or more content items (not shown) to client devices 104, 106, e.g., for display in graphical user interfaces that are rendered by client device 104, 106. Content management system 112 is also configured to generate viral metrics 120, 122, 124, 126 that are indicative of the performance of the content items that are selected and provided to client devices 104, 106, e.g., as described in further detail below. In this example, content management system 112 may be configured to store viral metrics 120, 122, 124, 126 in data repository 114. In the example of FIG. 1, viral metric 120 includes a VA metric (hereinafter VA metric 120), and viral metric 122 includes a VC metric (hereinafter VC metric 122).

In this example, viral metric 124 includes a cost per viral action (CPVA) metric (hereinafter CPVA metric 124). In this example, a content sponsor may specify a cost per action (CPA) that the content sponsor pays for a predefined action (e.g., a conversion, a form submission, and so forth) linked to a content item. Generally, a content sponsor includes an entity that promotes products. An advertiser is an example of a content sponsor. For example, the content sponsor may upload, to content management system 112, CPAs for content items of the content sponsor. In this example, the CPVA metric is based on the CPA and the VA metric. In an example, the CPVA metric is the CPA divided by the VA metric.

In an example, a content sponsor may adjust CPA based on the CPVA metric. In this example, the content sponsor has a net profit of selling a product or a service of $100. In accordance with the net profit, the content sponsor is willing to bid $99.99 CPA in an auction for display of the content item of the content sponsor. By collecting VA metrics, the content sponsor identifies that half of the conversions for the content item are attributable to viral actions, e.g., conversions that are initiated from the social networking service. In this example, the CPVA (or actual CPA) is $49.99. As a result, the content sponsor changes a bid to $99.99 CPVA, e.g., which equals $199.98 CPA. In an example, content management system 112 presents, to a content sponsor, CPVA metrics to promote an adjustment of CPA based on the CPVA metrics.

In the example of FIG. 1, viral metric 126 is a cost per viral click (CPVC) metric (hereinafter CPVC metric 126). In this example, a content sponsor may specify a cost per click that the content sponsor pays, to a publisher, when a content item is clicked. For example, the content sponsor may upload, to content management system 112, information specifying the cost per clicks for various content items. In this example, the CPVC metric is based on the cost per click and the VC metric. In an example, the CPVC metric is the cost per click divided by the VC metric.

In an example, a content sponsor may adjust a cost per click based on the CPVC metric. In this example, the content sponsor is willing to pay $0.50 for each click of the content item. By tracking VC metrics, the content sponsor identifies that half of the clicks to the landing page of the content item are viral clicks, e.g., clicks that are initiated from within the social networking service. In this example, the CPVC (or actual cost per click) is $0.25. As a result, the content sponsor changes the bid to $0.50 CPVA, e.g., which equals $1.00 cost per click. In an example, content management system 112 presents, to a content sponsor, CPVC metrics to promote an adjustment of cost per click based on the CPVC metrics.

Figure 2:
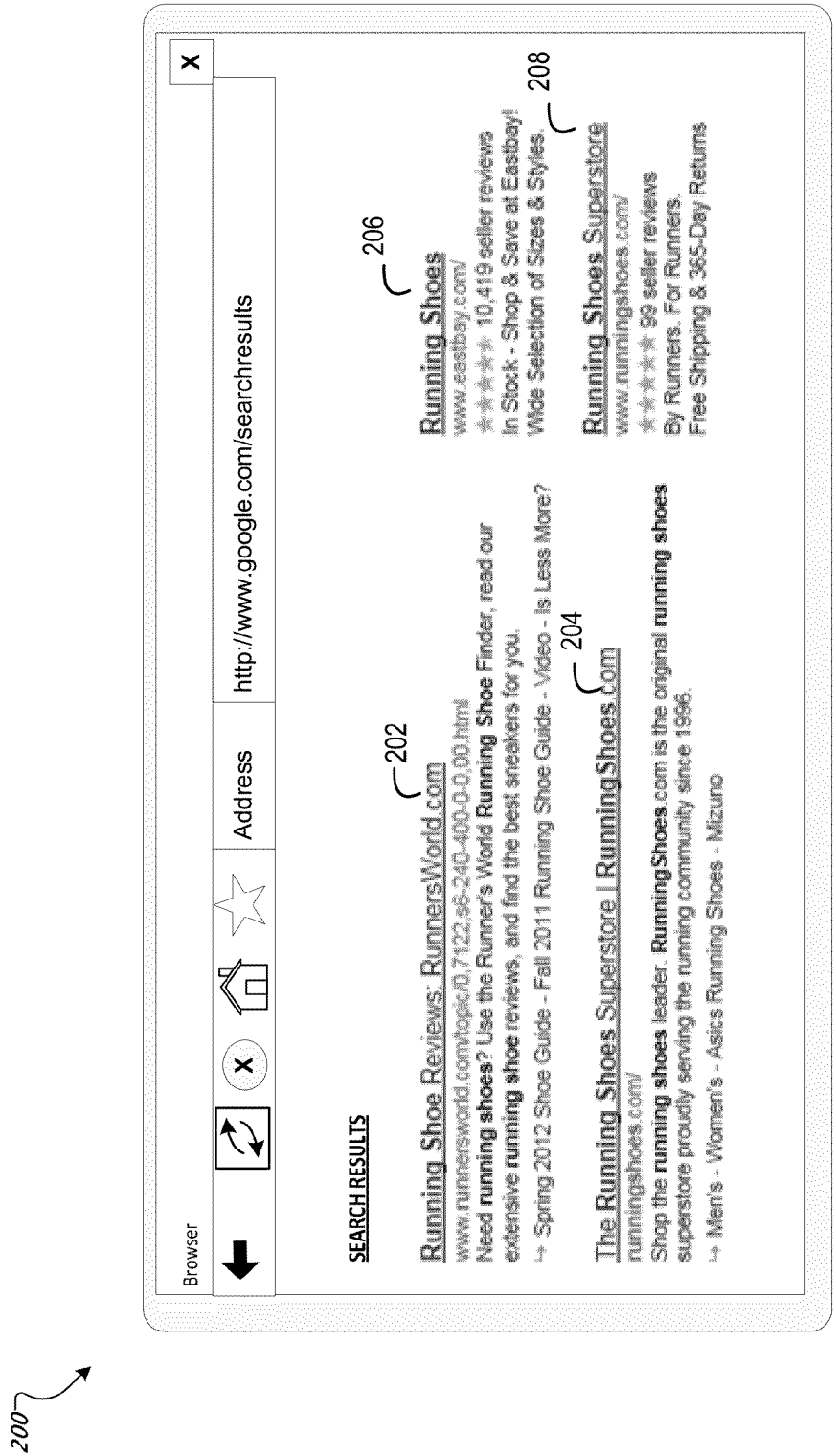
FIG. 2 is a diagram of a graphical user interface for display of search results and content items.

FIG. 2 is a diagram of graphical user interface 200 for display of search results 202, 204 and content items 206, 208. In this example, client device 104 (FIG. 1) sends to a search system (not shown) a search query (not shown). For example, the search query may include one or more search terms input by user 108 into a search box of a graphical user interface (not shown) that is displayed on client device 104. Using the search terms in the search query, the search system generates search results 202, 204. The search system sends, to client device 104, information for graphical user interface 200 with search results 202, 204.

In this example, the information for graphical user interface 200 (e.g., the code source for graphical user interface 200) may include instructions that are executable, by client device 104, to cause client device 104 to request one or more content items from content management system 112. In response, content management system 112 executes an auction and selects content items 206, 208 for display in graphical user interface 200. In this example, content management system 110 sends, to client device 104, information for content items 206, 208. Following receipt of the information, client device 104 renders content items 206, 208 in graphical user interface 200.

Figure 3:
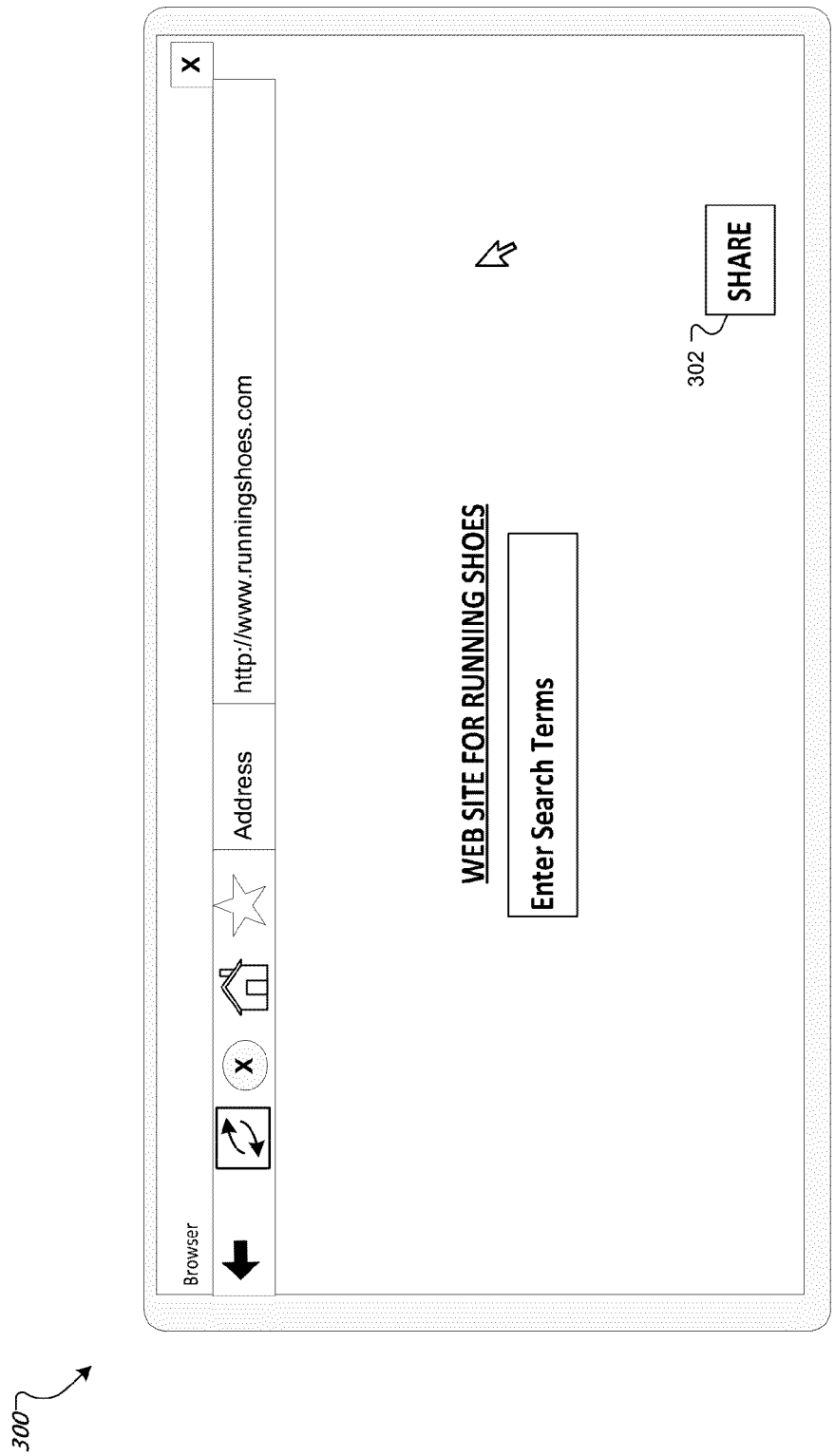
FIG. 3 shows an example landing page for a content item.

FIG. 3 shows an example landing page 300 for content item 206. Publisher system 118 hosts information for landing page 300. For example, selection of content item 206 causes client device 104 to request, from publisher system 118, information for landing page 300. In response, publisher system 118 sends, to client device 104, information for landing page 300. Using the received information, client device 104 renders landing page 300. In the example of FIG. 3, landing page 300 includes control 302. Selection of control 302 indicates that user 108 endorses landing page 300 to other users of social networking system 116.

Following selection of control 302, client device 106 sends, to social networking system 116, a message indicating that user 108 endorses landing page 300. In response, social networking system 116 identifies other users of social networking system 116 with social connections to user 108. In this example, user 110 has a social connection to user 108 in social networking system 116. Based on the social connection between user 108 and user 110, social networking system 116 updates a content stream of user 110 with information specifying that user 108 endorses landing page 300.

In the example of FIG. 3, landing page 300 is one of the web pages in a website pertaining to running shoes. For example, landing page 300 is a page for the searching of running shoes. The other pages in the website may pertain to the viewing of particular running shoes, the purchasing of particular running shoes and so forth. In this example, control 302 may be displayed in one or more of the other web pages in the website, e.g., to promote a user's endorsement of the other web pages.

Figure 4:
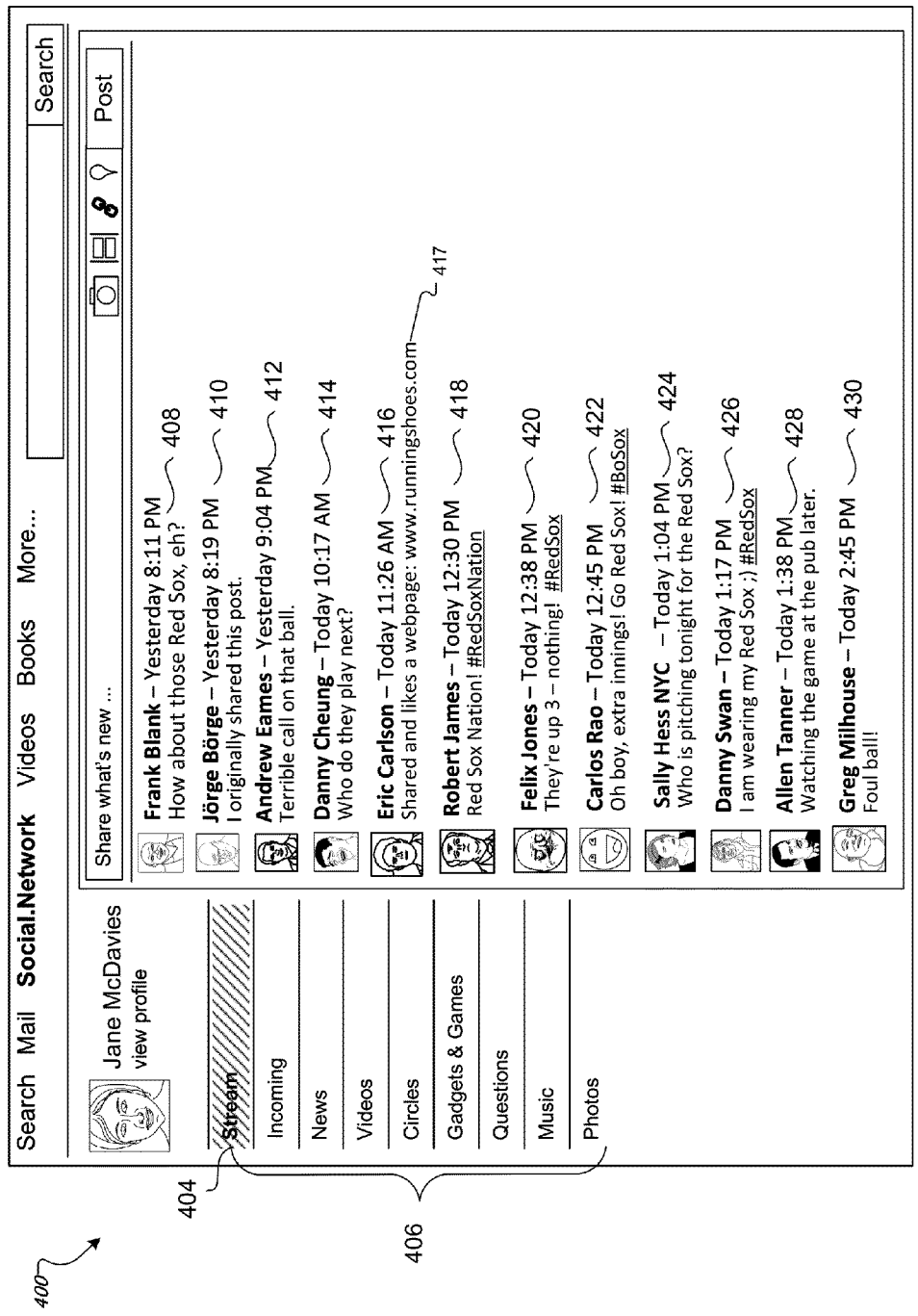
FIG. 4 shows an example main page for a member of a social networking system.

FIG. 4 shows an example main page 400 for a member of social networking system 116. In this example, page 400 is associated with user 110, who is a member of social networking system 116. For example, page 400 can be provided as a web page within a website of social networking system 116, and can display electronic content that has been shared with user 110 associated with page 400.

In the illustrated example, user 110 is "Jane McDavies" and page 400 displays, items (e.g., electronic content) that other members have shared with user 110 and/or items that user 110 has shared with other members. Page 400 also includes social network menu 406 and content stream 404, in which content items 408, 410, 412, 414, 416, 418, 420, 422, 424, 426, 428, 430 are presented. Example content items 408, 410, 412, 414, 416, 418, 420, 422, 424, 426, 428, 430 that have been distributed to user 110 are displayed in content stream 404. Generally, items 408, 410, 412, 414, 416, 418, 420, 422, 424, 426, 428, 430 displayed in content stream 404 include electronic content that is distributed to user 110 from contacts established within social networking system 116. Although twelve content items are depicted in FIG. 4, it is appreciated that page 400 can display more or less than twelve content items to user 110.

In the example of FIG. 4, content item 416 includes the endorsement by user 108 of landing page 300. Content item 416 also includes pointer 417 to landing page 300. Generally, a pointer includes a reference from one item of data to another item of data. In this example, pointer 417 includes an HTML link.

Pointer 417 is associated with identification information for content item 206 (FIG. 2). For example, the identification information may include a unique identifier for content item 206. Pointer 417 is associated with content item 206 because selection of content item 206 causes landing page 300 to be displayed to user 108, which in turn is endorsed by user 108, which in turn causes content item 416 to be displayed in content stream 404.

In the example of FIG. 4, pointer 417 may be associated with the identification information for content item 206 by having metadata embedded in the code source for pointer 417. The metadata includes the unique identifier for content item 206. Generally, metadata includes an item of data about another item of data.

In an example, user selects pointer 417. Selection of pointer 417 is a virtual click, because it is a selection of a reference from within a social networking service. When user 110 selects pointer 417, client device 106 sends, to content management system 112, (i) information specifying that pointer 417 was selected, and (ii) the identification information for content item 206. In response, content management system 112 updates VC metric 122 associated with content item 206 to track the viral click by user 110. In this example, VC metric 122 includes a counter. Content management system 112 updates VC metric 122 by incrementing the counter by a value of one.

Additionally, as described in further detail below, content management system 112 tracks a number of conversions that are attributable to selection of pointer 417. For example, content management system 112 tracks whether a conversion results from selection of pointer 417. A conversion that results from selection of pointer 417 is a virtual action, including, e.g., completion of a predefined action that is initiated from within a social networking service.

When content management system 112 determines that a conversion results from selection of pointer 417, content management system 112 updates VA metric 120. In this example, VA metric 120 includes a counter. Content management system updates VA metric 120 by incrementing the counter by a value of one. Using VA metric 120 and VC metric 122, content management system 112 may generate one or more derivative, viral metrics, including, e.g., viral metrics that are at least partly based on other viral metrics. In this example, derivative, viral metrics include CPCA metric 124 and CPVC metric 126.

Figure 5:
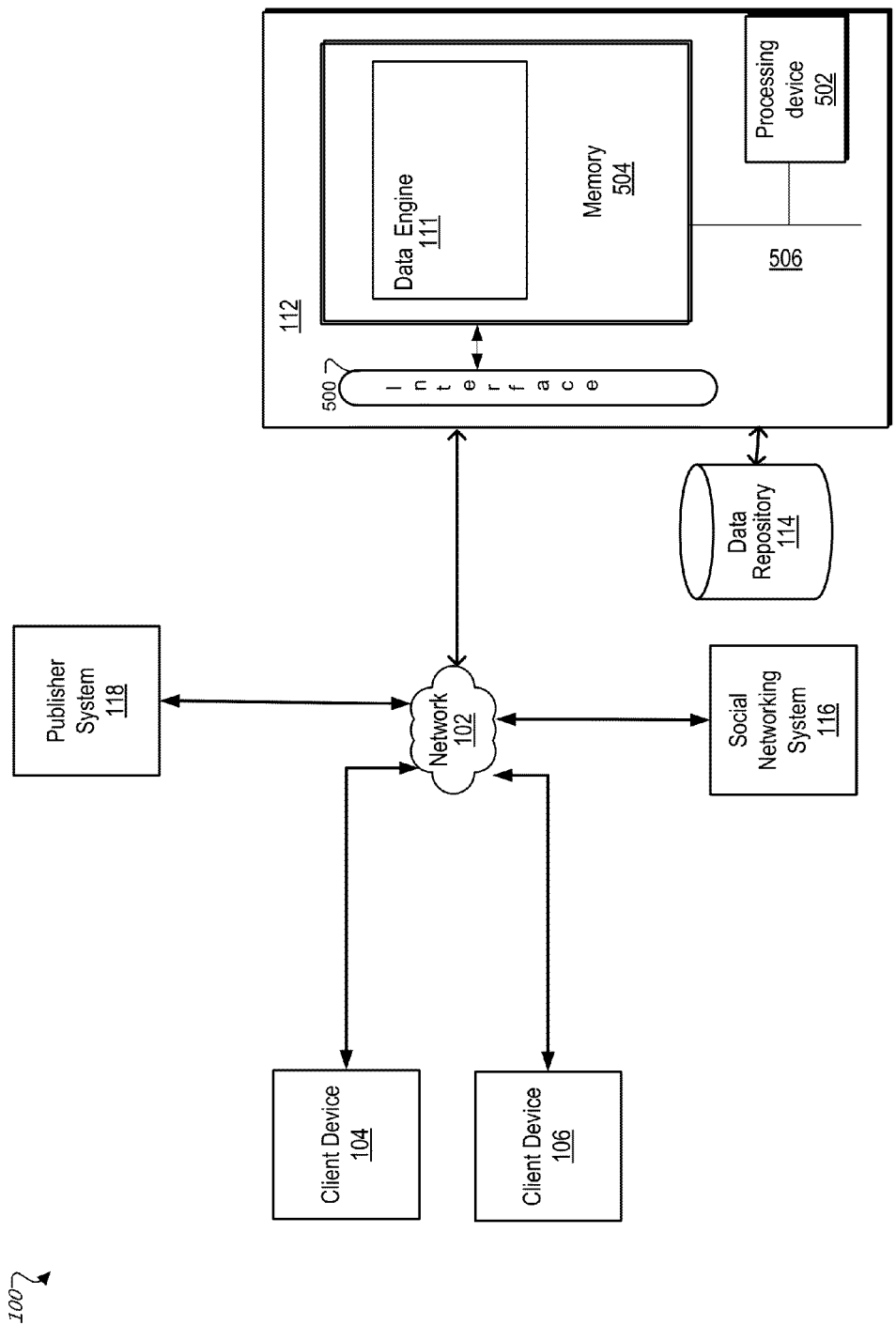
FIG. 5 is a block diagram showing examples of components of the network environment for generating viral metrics.

FIG. 5 is a block diagram showing examples of components of network environment 100 for generating metrics relating to performance of a content item. In the example of FIG. 5, users 108, 110 and viral metrics 120, 122, 124, 126 are not shown.

Client devices 104, 106 can each be a computing device capable of taking input from users 108, 110 (FIG. 1), respectively, and communicating over network 102 with content management system 112 and/or with other computing devices. For example, client devices 104, 106 can each be a mobile device, a desktop computer, a laptop, a cell phone, a personal digital assistant (PDA), a server, an embedded computing system, a mobile device, and the like. Network environment 100 can include a plurality of computing devices, which can be geographically dispersed.

Network 102 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, including, e.g., using a Bluetooth, WiFi, or other such transceiver.

Content management system 112 can be a variety of computing devices capable of receiving data and running one or more services, which can be accessed by client devices 104, 106. In an example, content management system 112 can include a server, a distributed computing system, a desktop computer, a laptop, a cell phone, a rack-mounted server, and the like. Content management system 112 can be a single server or a group of servers that are at a same location or at different locations. Client devices 104, 106 and content management system 112 can run programs having a client-server relationship to each other. Although distinct modules are shown in the figures, in some examples, client and server programs can run on the same device.

Content management system 112 can receive data from client devices 104, 106 (and/or from data repository 114) through input/output (I/O) interface 500. I/O interface 500 can be a type of interface capable of receiving data over a network, including, e.g., an Ethernet interface, a wireless networking interface, a fiber-optic networking interface, a modem, and the like. Content management system 112 also includes a processing device 502 and memory 504. A bus system 506, including, for example, a data bus and a motherboard, can be used to establish and to control data communication between the components of content management system.

Processing device 502 can include one or more microprocessors. Generally, processing device 502 can include an appropriate processor and/or logic that is capable of receiving and storing data, and of communicating over a network (not shown). Memory 504 can include a hard drive and a random access memory storage device, including, e.g., a dynamic random access memory, or other types of non-transitory machine-readable storage devices. As shown in FIG. 5, memory 504 stores computer programs that are executable by processing device 502. These computer programs include data engine 111. Data engine 111 can be implemented in software running on a computer device (e.g., content management system 112), hardware or a combination of software and hardware.

Figure 6:
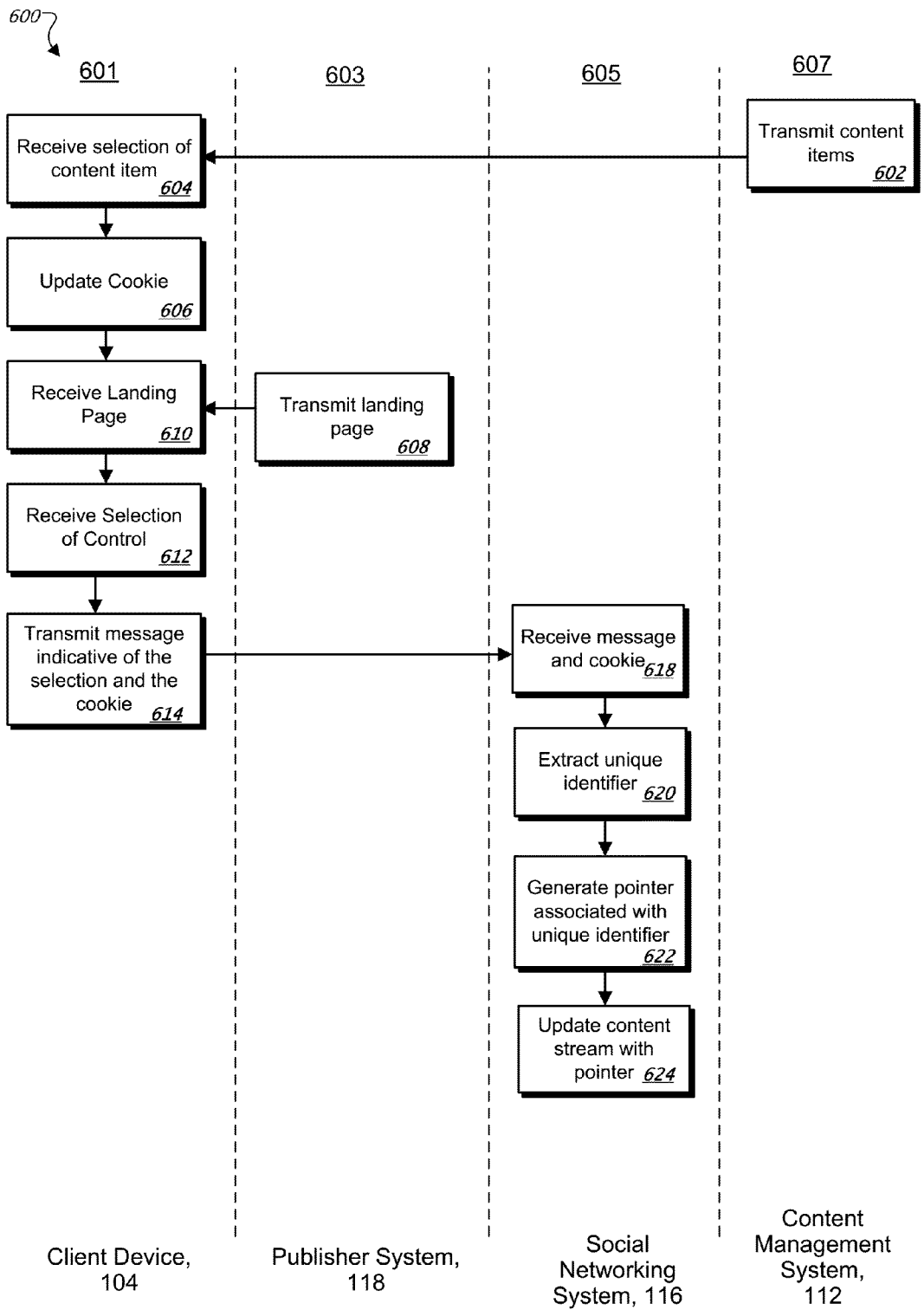
FIG. 6 is a flowchart showing a process for populating a content stream with information indicative of an endorsement of a landing page for a content item.

FIG. 6 is a flowchart showing process 600 for populating a content stream with information indicative of an endorsement of a landing page for a content item. In FIG. 6, process 600 is split into parts 601, 603, 605, 607. Part 601 may be performed on client device 104. Part 603 may be performed on publisher system 118. Part 605 may be performed on social networking system 116. Part 607 may be performed on content management system 112 (and/or by data engine 111).

In operation, content items are transmitted (602). For example, content management system 112 transmits (602) content items 206, 208 (FIG. 2) to client device 104. In this example, content management system 112 executes an auction to select content items 206, 208 for transmission to client device 104.

In the example of FIG. 6, content items are received (not shown). For example, client device 104 receives (not shown) content items 206, 208 and displays content items in graphical user interface 200. A selection of a content item is received (604). For example, client device 104 receives (604), from user 108, information indicative of a selection of one of content items 206, 208. In response to receipt of the selection of a content item, a cookie is updated (606). For example, client device 104 updates (606) a cookie stored on client device 104 with information specifying the selection of content item 206. Generally, a cookie includes a piece of data stored in a user's web browser while a user is browsing a website.

In this example, when content management system 112 transmits content items to client device 104, content management system 112 also transmits a cookie to client device 104. In this example, the cookie is configured to store information associated with the content items transmitted by content management system 112. For example, upon selection of one of the content items, client device 104 updates the cookie with information specifying which of the content items was selected. For example, a content item may be associated with a unique identifier. In this example, the cookie is updated with the unique identifier for the content item that is selected by user 108.

In the example of FIG. 6, a landing page is also transmitted (608). For example, upon selection of a content item, client device 104 requests, from publisher system 118, a landing page associated with the selected content item. In response, publisher system 118 transmits (608) the landing page to client device 104. The landing page is received (610). For example, client device 104 receives (610) the landing page.

Referring back to FIG. 3, landing page 300 may be received by client device 104. As previously described, landing page 300 includes control 302 for a user to endorse landing page 300 in social networking system 116. In the example of FIG. 6, a selection of a control is received (612). For example, client device 104 receives (612) a selection of control 302. In response, a message indicative of the selection of the control and the cookie is transmitted (614). For example, client device 104 transmits (614), to social networking system 116, the message indicative of the selection of the control and the cookie.

The message and the cookie are received (618). For example, social networking system 116 receives (618) the message and the cookie. In response, the unique identifier of the selected content item is extracted from the cookie (620). For example, social networking system 116 extracts (620) the unique identifier for the selected content item from the cookie.

In the example of FIG. 6, a pointer associated with the unique identifier for the selected content item is generated (622). For example, social networking system 116 generates (622) a pointer associated with the unique identifier for the selected content item. For example, referring back to FIG. 4, social networking system 116 may generate pointer 417 that is associated with a unique identifier of selected content item 206. As previously described, pointer 417 may be associated with selected content item 206 through metadata in the source code for pointer 417 that includes the unique identifier for selected content item 206.

A content stream is updated with the pointer (624). For example, social networking system 116 updates (624) a content stream with the pointer. Referring back to FIG. 4, social networking system 116 updates content stream 404 with content item 416 that includes pointer 417.

Figure 7:
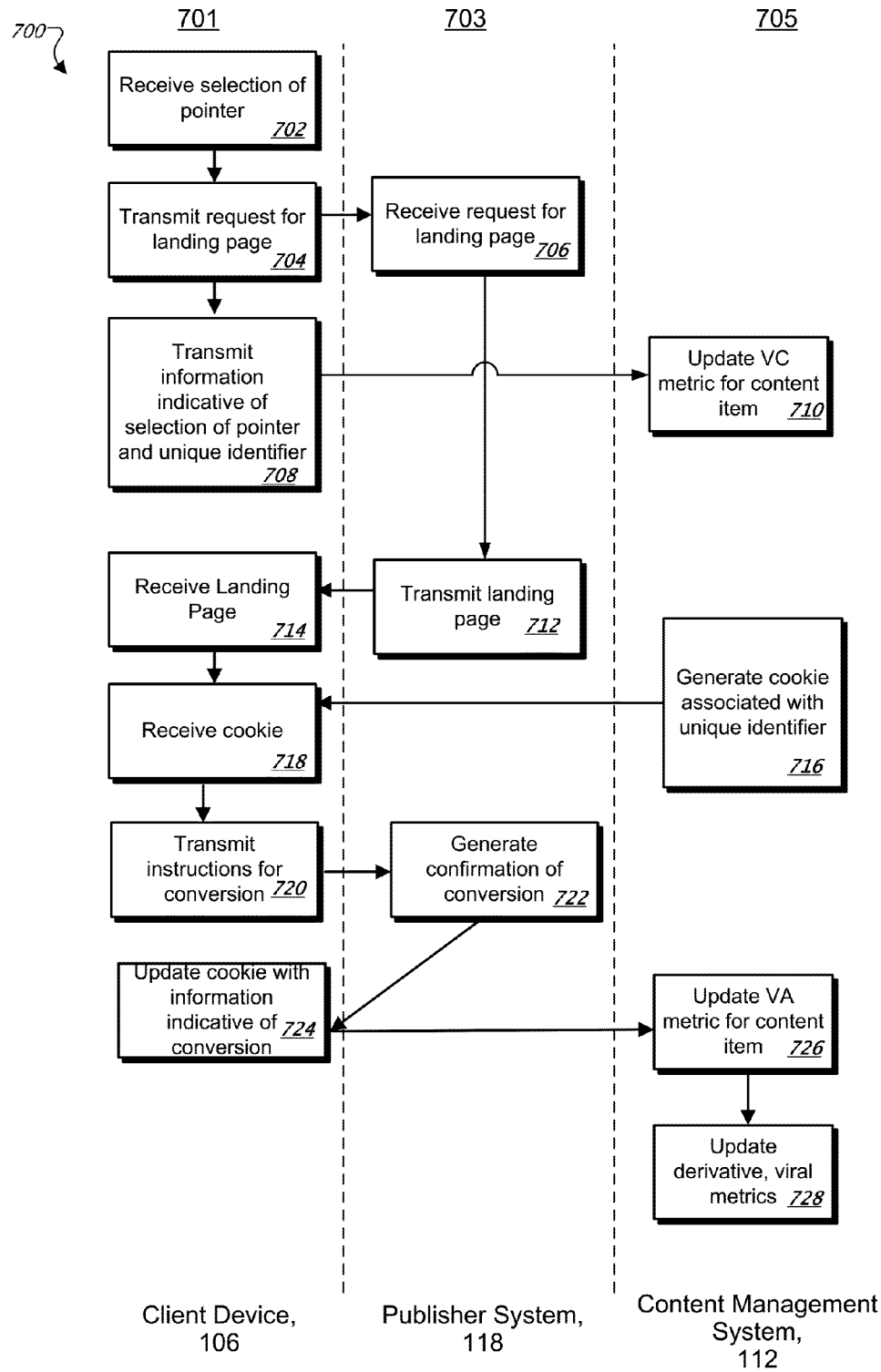
FIG. 7 is a flowchart showing a process for generating viral metrics.

FIG. 7 is a flowchart showing process 700 for generating viral metrics 120, 122, 124, 126. In FIG. 7, process 700 is split into parts 701, 703, 705. Part 701 may be performed on client device 106. Part 703 may be performed on publisher system 118. Part 705 may be performed on content management system 112 (and/or by data engine 111).

In operation, selection of a pointer to an endorsed landing page of a content item is received (702). For example, client device 106 receives (702) a selection, by user 110, of pointer 417 (FIG. 4). In response to selection of the pointer, a request for a landing page associated with the pointer is transmitted (704). For example, client device 106 transmits (704), to publisher system 118, a request for the landing page (e.g., landing page 300 shown in FIG. 3).

The request for the landing page is received (706). For example, publisher system 118 receives (706) the request for the landing page. In response, the landing page is transmitted (712). For example, publisher system 118 transmits (712) the landing page to client device 106. The landing page is received (714). For example, client device 106 receives (714) the landing page.

In the example of FIG. 7, following selection of the pointer, information indicative of the selection of the pointer is transmitted (708). For example, client device 106 transmits (708), to content management system 112, the information indicative of the selection of the pointer. Client device 106 also transmits, to content management system 112, the unique identifier that is associated with the pointer. As previously described, the unique identifier specifies a selected content item that is associated with the landing page being endorsed. In turn, the landing page being endorsed (e.g., landing page 300) is associated with a selected content item (e.g., content item 206).

In the example of FIG. 7, content management system 112 receives the information indicative of the selection of the pointer and the unique identifier for the selected content item. Content management system 112 uses the information indicative of the selection of the pointer and the unique identifier for the selected content item to update VC metrics for the selected content item. In an example, content management system 112 identifies VC metrics associated with the content item specified by the unique identifier. The VC metric (e.g., VC metric 122) for the selected content item is updated, e.g., by being incremented by a value of one (710). For example, content management system 112 updates (710) VC metric 122 for the selected content item.

To promote tracking of conversions (e.g., by user 110) that result from selection of the pointer (e.g., pointer 417) for the endorsed landing page (e.g., landing page 300) associated with the selected content item (e.g., content item 206), a cookie including the unique identifier of the selected content item is also generated (716). For example, content management system 112 generates (716) a cookie including the unique identifier of the selected content item.

As previously described, a website may be associated with the selected content item. For example, the website may pertain to running shoes. Selection of the content item may direct a user to the website. Through the generated cookie, content management system 112 may collect information specifying which webpages in the website are accessed by a client device and whether a user completes a conversion on the website. The generated cookie is received (718). For example, client device 106 receives (718) the generated cookie.

In this example, user 110 browses the website associated with the selected content item. Through entry of various information into the webpages of the website and selection of various controls by user 110, instructions for a conversion are transmitted 720. For example, client device 106 transmits (720), to publisher system 118, instructions for a conversion. In response, publisher system 118 performs various actions to implement the conversion. A confirmation of the conversion is generated (722). For example, publisher system 118 generates (722) a confirmation message indicating confirmation of the conversion. The confirmation message is sent to client device 106.

In response to receipt of the confirmation message, the cookie is updated with information indicative of completion of the conversion (724). For example client device 106 updates (724) the cookie stored on client device 106 with information indicative of completion of the conversion. Client device 106 also sends the updated cookie to content management system 112. In this example, the website from which the conversion was completed includes one or more instructions that, when executed by client device 106, cause client device 106 to update the cookie with information indicative of the completion of the conversion and to send the updated cookie to content management system 112.

In the example of FIG. 7, VA metrics are updated using the contents of the cookie (726). For example, content management system 112 updates (726) VA metric 120 using the contents of the cookie. Content management system 112 parses the cookie to extract the unique identifier included in the cookie. As previously described, the unique identifier is for the selected content item (e.g., content item 206). In this example, the VA metrics are also associated with unique identifiers of the various content items managed by content management system 112. Content management system 112 identifies a match between the extracted unique identifier and one of the unique identifiers for the VA metrics. Content management system 112 updates the VA metric with the matching unique identifier. As previously described, the VA metric may include a counter that it incremented by a value of one.

Derivative, viral metrics are also updated (728). For example, content management system 112 uses updated VA and VC metrics in updating (728) CPVA and CPVC metrics.

Figure 8:
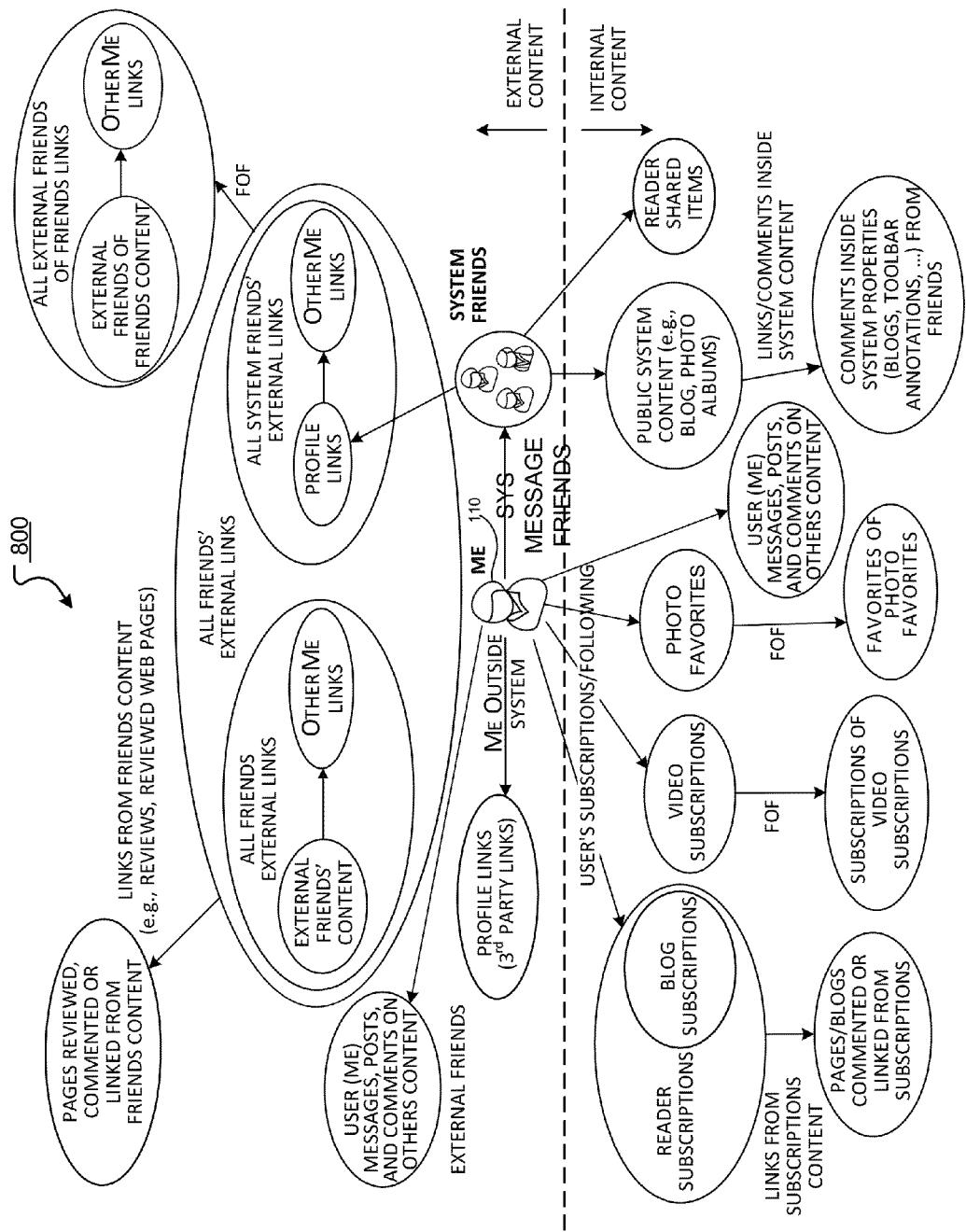
FIG. 8 is a conceptual view of an example social graph.

FIG. 8 is an example social graph 800. A social graph is a way to represent, graphically, social connections between two parties that may, or may not, be on the same social network, and to represent connections between parties and content. A party may be an individual (e.g., users 108, 110) or an entity, e.g., a company, organization, country, or the like.

In an example, content items 408, 410, 412, 414, 416, 418, 420, 422, 424, 426, 428, 430 are associated with user 110 through one or more connections in a social graph (e.g., social graph 800). Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Among other things, FIG. 8 shows sources of information for a social graph. In this example, the user's social graph is a collection of connections (e.g., users, resources/content, etc.) identified as having a relationship to user 110 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 8 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index (not shown) in data repository 114. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an opt-out option or by keeping contacts out of particular groups used to generate the social graph. In some implementations, privacy features provide a user with an opt-in or opt-out option to allow or to prevent, respectively, being included (or removed the user if already included) as a member of another's social graph. Thus, users may have control over what personal information or connection information, if existing, is included in their social graphs and, consequently, that is included in the content streams and search results described herein.

Using the techniques described herein, a system is configured to generated viral metrics, including, e.g., VA and VC metrics. Using the viral metrics, the system is also configured to generate derivative, viral metrics, including, e.g., CPVC and CPCA metrics.

Figure 9:
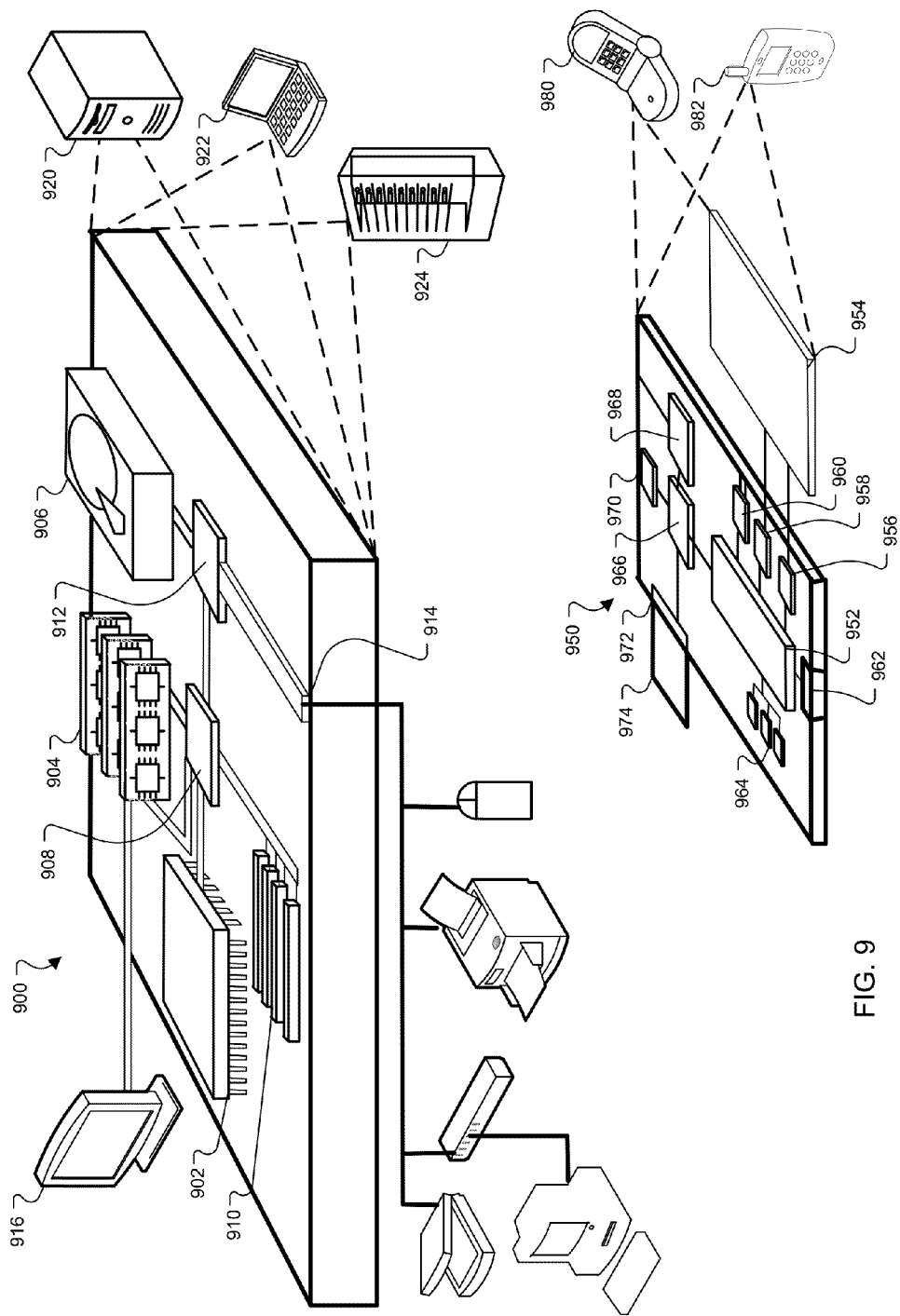
FIG. 9 shows an example of a computer device and a mobile computer device that can be used to implement the techniques described herein.

FIG. 9 shows an example of computer device 900 and mobile computer device 950, which can be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906 to display graphical data for a GUI on an external input/output device, such as display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

Memory 904 stores data within computing device 900. In one implementation, memory 904 is a volatile memory unit or units. In another implementation, memory 904 is a non-volatile memory unit or units. Memory 904 also can be another form of computer-readable medium, such as a magnetic or optical disk.

Storage device 906 is capable of providing mass storage for computing device 900. In one implementation, storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, such as those described above. The data carrier is a computer- or machine-readable medium, such as memory 904, storage device 906, memory on processor 902, and the like.

High-speed controller 908 manages bandwidth-intensive operations for computing device 900, while low speed controller 912 manages lower bandwidth-intensive operations. Such allocation of functions is an example only. In one implementation, high-speed controller 908 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer such as laptop computer 922. In some examples, components from computing device 900 can be combined with other components in a mobile device (not shown), such as device 950. Each of such devices can contain one or more of computing device 900, 950, and an entire system can be made up of multiple computing devices 900, 950 communicating with each other.

Computing device 950 includes processor 952, memory 964, an input/output device such as display 954, communication interface 966, and transceiver 968, among other components. Device 950 also can be provided with a storage device, such as a microdrive or other device, to provide additional storage. Each of components 950, 952, 964, 954, 966, and 968, are interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for coordination of the other components of device 950, such as control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations, and multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 950 through expansion interface 972, which can include, for example, a SIMM (Single In Line Memory Module) card interface. Such expansion memory 974 can provide extra storage space for device 950, or also can store applications or other data for device 950. Specifically, expansion memory 974 can include instructions to carry out or supplement the processes described above, and can include secure data also. Thus, for example, expansion memory 974 can be provide as a security module for device 950, and can be programmed with instructions that permit secure use of device 950. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in an data carrier. The computer program product contains instructions that, when executed, perform one or more methods, such as those described above. The data carrier is a computer- or machine-readable medium, such as memory 964, expansion memory 974, and/or memory on processor 952, that can be received, for example, over transceiver 968 or external interface 962.

Device 950 can communicate wirelessly through communication interface 966, which can include digital signal processing circuitry where necessary. Communication interface 966 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, such as using a Bluetooth®, WiFi, or other such transceiver (not shown). In addition, GPS (Global Positioning System) receiver module 970 can provide additional navigation- and location-related wireless data to device 950, which can be used as appropriate by applications running on device 950.

Device 950 also can communicate audibly using audio codec 960, which can receive spoken data from a user and convert it to usable digital data. Audio codec 960 can likewise generate audible sound for a user, such as through a speaker, e.g., in a handset of device 950. Such sound can include sound from voice telephone calls, can include recorded sound (e.g., voice messages, music files, and the like) and also can include sound generated by applications operating on device 950.

Computing device 950 can be implemented in a number of different forms, as shown in the figure. For example, it can be implemented as cellular telephone 980. It also can be implemented as part of smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by a networked system comprising one or more processing devices, comprising:
    transmitting, by the networked system to a first client device, content items for display in a resource, with the resource being external to a social networking system of which a first user associated with the first client device is a member;
    wherein one of the content items is selectable by the first user to cause display of a landing page for a selected one of the content items, with the landing page differing from the resource that displays the content items, and with the landing page being external to the social networking system of which the first user is the member;
    wherein the landing page comprises a control for enabling the first user to recommend the landing page that is external to the social networking system by posting a reference to the landing page in the social networking system of which the first user is the member;
    receiving, by the networked system from a second client device, information indicative of a selection in the social networking system of the reference to the landing page that is external to the social networking system, with the selection being made by a second user of the second client device;
    wherein the first user of the first client device has a social connection in the social networking system to the second user of the second client device; and
    generating, by the networked system based on the information received, one or more viral metrics for the selected one of the content items, with the one or more viral metrics indicating an amount of visits by users of the social networking system to the landing page that is external to the social networking system, with the visits being attributable to (i) the first user selecting the one of the content items displayed in the resource that is external to the social networking system to view the landing page for the selected one of the content items, (ii) the first user afterwards recommending, via selection of the control in the landing page that is external to the social networking system, the landing page to other users with whom the first user shares a social connection in the social networking system, and (iii) one or more of the other users selecting, in the social networking system, the reference to the landing page that is external to the social networking system to view the landing page outside of the social networking system.

2. The method of claim 1, wherein at least one of the one or more viral metrics comprises a viral click metric.

3. The method of claim 1, wherein the reference is indicative of an endorsement of the landing page for the selected one of the content items.

4. The method of claim 1, further comprising:
    receiving information indicative of performance of an action following selection of the reference; and
    generating one or more viral action metrics for the selected one of the content items based on the information indicative of performance of the action.

5. The method of claim 1, further comprising:
    generating, from the one or more viral metrics, one or more derivative, viral metrics.

6. The method of claim 5, wherein the one or more derivative, viral metrics comprises:
    a cost per viral action metric; or
    a cost per viral click metric.

7. One or more machine-readable hardware storage devices storing instructions that are executable by one or more processing devices of a networked system to perform operations comprising:
    transmitting, by the networked system to a first client device, content items for display in a resource, with the resource being external to a social networking system of which a first user associated with the first client device is a member;
    wherein one of the content items is selectable by the first user to cause display of a landing page for a selected one of the content items, with the landing page differing from the resource that displays the content items, and with the landing page being external to the social networking system of which the first user is the member;
    wherein the landing page comprises a control for enabling the first user to recommend the landing page that is external to the social networking system by posting a reference to the landing page in the social networking system of which the first user is the member;

receiving, by the networked system from a second client device, information indicative of a selection in the social networking system of the reference to the landing page that is external to the social networking system, with the selection being made by a second user of the second client device;

wherein the first user of the first client device has a social connection in the social networking system to the second user of the second client device; and generating, by the networked system based on the information received, one or more viral metrics for the selected one of the content items, with the one or more viral metrics indicating an amount of visits by users of the social networking system to the landing page that is external to the social networking system, with the visits being that is attributable to (i) the first user selecting the one of the content items displayed in the resource that is external to the social networking system to view the landing page for the selected one of the content items, (ii) the first user afterwards recommending, via selection of the control in the landing page that is external to the social networking system, the landing page to other users with whom the first user shares a social connection in the social networking system, and (iii) one or more of the other users selecting, in the social networking system, the reference to the landing page that is external to the social networking system to view the landing page outside of the social networking system.

8. The one or more machine-readable hardware storage devices of claim 7, wherein at least one of the one or more viral metrics comprises a viral click metric.

9. The one or more machine-readable hardware storage devices of claim 7, wherein the reference is indicative of an endorsement of the landing page for the selected one of the content items.

10. The one or more machine-readable hardware storage devices of claim 7, wherein the operations further comprise:
receiving information indicative of performance of an action following selection of the reference; and
generating one or more viral action metrics for the selected one of the content items based on the information indicative of performance of the action.

11. The one or more machine-readable hardware storage devices of claim 7, wherein the operations further comprise:
generating, from the one or more viral metrics, one or more derivative, viral metrics.

12. The one or more machine-readable hardware storage devices of claim 11, wherein the one or more derivative, viral metrics comprises:
a cost per viral action metric; or
a cost per viral click metric.

13. An electronic networked system comprising:
one or more processing devices; and
one or more machine-readable hardware storage devices storing instructions that are executable by the one or more processing devices to perform operations comprising:
transmitting, by the electronic networked system to a first client device, content items for display in a resource, with the resource being external to a social networking system of which a first user associated with the first client device is a member;

wherein one of the content items is selectable by the first user to cause display of a landing page for a selected one of the content items, with the landing page differing from the resource that displays the content items, and with the landing page being external to the social networking system of which the first user is the member;

wherein the landing page comprises a control for enabling the first user to recommend the landing page that is external to the social networking system by posting a reference to the landing page in the social networking system of which the first user is the member;

receiving, by the electronic networked system from a second client device, information indicative of a selection in the social networking system of the reference to the landing page that is external to the social networking system, with the selection being made by a second user of the second client device;

wherein the first user of the first client device has a social connection in the social networking system to the second user of the second client device; and generating, by the electronic networked system based on the information received, one or more viral metrics for the selected one of the content items, with the one or more viral metrics indicating an amount of visits by users of the social networking system activity pertaining to the landing page that is external to the social networking system, with the visits being that is attributable to (i) the first user selecting the one of the content items displayed in the resource that is external to the social networking system to view the landing page for the selected one of the content items, (ii) the first user afterwards recommending, via selection of the control in the landing page that is external to the social networking system, the landing page to other users with whom the first user shares a social connection in the social networking system, and (iii) one or more of the other users selecting, in the social networking system, the reference to the landing page that is external to the social networking system to view the landing page outside of the social networking system.

14. The electronic networked system of claim 13, wherein at least one of the one or more viral metrics comprises a viral click metric.

15. The electronic networked system of claim 13, wherein the reference is indicative of an endorsement of the landing page for the selected one of the content items.

16. The electronic networked system of claim 13, wherein the operations further comprise:
receiving information indicative of performance of an action following selection of the reference; and
generating one or more viral action metrics for the selected one of the content items based on the information indicative of performance of the action.

17. The electronic networked system of claim 13, wherein the operations further comprise:
generating, from the one or more viral metrics, one or more derivative, viral metrics.

18. The electronic networked system of claim 17, wherein the one or more derivative, viral metrics comprises:
a cost per viral action metric; or
a cost per viral click metric.

* * * * *